United States Patent
Williams et al.

(10) Patent No.: US 7,414,247 B2
(45) Date of Patent: Aug. 19, 2008

(54) METHODS AND APPARATUS FOR GEOPHYSICAL LOGGING

(75) Inventors: James Richard Williams, University Heights, OH (US); Brian M. Palmer, Perkasie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/457,999

(22) Filed: Jul. 17, 2006

(65) Prior Publication Data

US 2008/0011957 A1   Jan. 17, 2008

(51) Int. Cl.
*G01T 1/20* (2006.01)

(52) U.S. Cl. .................. 250/368; 250/361 R
(58) Field of Classification Search .......... 250/361 R, 250/367, 368
See application file for complete search history.

(56) References Cited

U.S. PATENT DOCUMENTS

| 4,037,105 | A | * | 7/1977 | Laurer ..................... 250/367 |
| 4,213,054 | A | * | 7/1980 | Doherty, III ........... 250/363.04 |
| 4,843,245 | A | * | 6/1989 | Lecomte .................. 250/367 |
| 5,008,546 | A | * | 4/1991 | Mazziotta et al. ........... 250/366 |
| 5,434,415 | A | * | 7/1995 | Terada et al. ............... 250/368 |
| 5,637,882 | A |   | 6/1997 | Divigalpitiya et al. |
| 6,657,201 | B2 |  | 12/2003 | DeJule |
| 2005/0167605 | A1 | * | 8/2005 | Juni ..................... 250/370.11 |

* cited by examiner

*Primary Examiner*—David P. Porta
*Assistant Examiner*—Mark R Gaworecki
(74) *Attorney, Agent, or Firm*—Armstrong Teasdale LLP

(57) ABSTRACT

Apparatus and assemblies for a borehole survey instrument are provided. A radiation detector includes a photo-detector, and a scintillator optically coupled to the photo-detector wherein the scintillator is formed in at least one of a cylindrical segment shape and a truncated frustocylindrical shape.

19 Claims, 2 Drawing Sheets

US 7,414,247 B2

METHODS AND APPARATUS FOR GEOPHYSICAL LOGGING

BACKGROUND OF THE INVENTION

This invention relates generally to radiation detectors and more particularly, to scintillators used in radiation detectors.

Due to the nature of geophysical drilling, boreholes used for geophysical logging and oil and gas production generally are circular in cross-section. Therefore, the tools used to log these boreholes are substantially cylindrical to accommodate the dimensions of the borehole. Tools used in the borehole such as for radiation surveying of the borehole, experience elevated pressures and temperatures with respect to surface ambient conditions. Due to the pressures experienced when the borehole is filled with fluid, a substantial cross-section of the tool is used to resist this pressure, leaving a relatively small amount of space available for instrumentation. It is important then that the remaining space be optimally used. Known scintillation radiation detectors used for borehole surveying are straight cylindrical or very similar objects of revolution. Such shapes, while simple to machine, waste much available shape and therefore limit the sensitivity of the entire tool. To facilitate improving detector sensitivity multiple detectors of smaller size have been used. However, such approaches require each scintillator to be coupled to photomultiplier, which greatly increases the cost of the detector.

BRIEF DESCRIPTION OF THE INVENTION

In one embodiment, a borehole survey instrument includes a photo-detector, and a scintillator optically coupled to the photo-detector wherein the scintillator is formed in at least one of a cylindrical segment shape and a truncated frustocylindrical shape.

In another embodiment, a radiation detector includes a photo-detector, and a scintillator optically coupled to the photo-detector wherein the scintillator is formed in a rectangular slab shape.

In yet another embodiment, a borehole logging tool includes a housing configured to substantially seal a downhole logging environment from an interior of the housing, and a survey instrument enclosed within the housing, the survey instrument including a photo-detector, and a scintillator optically coupled to the photo-detector, the scintillator formed in a non-right circular cylindrical shape.

DETAILED DESCRIPTION OF THE INVENTION

Figure 1:
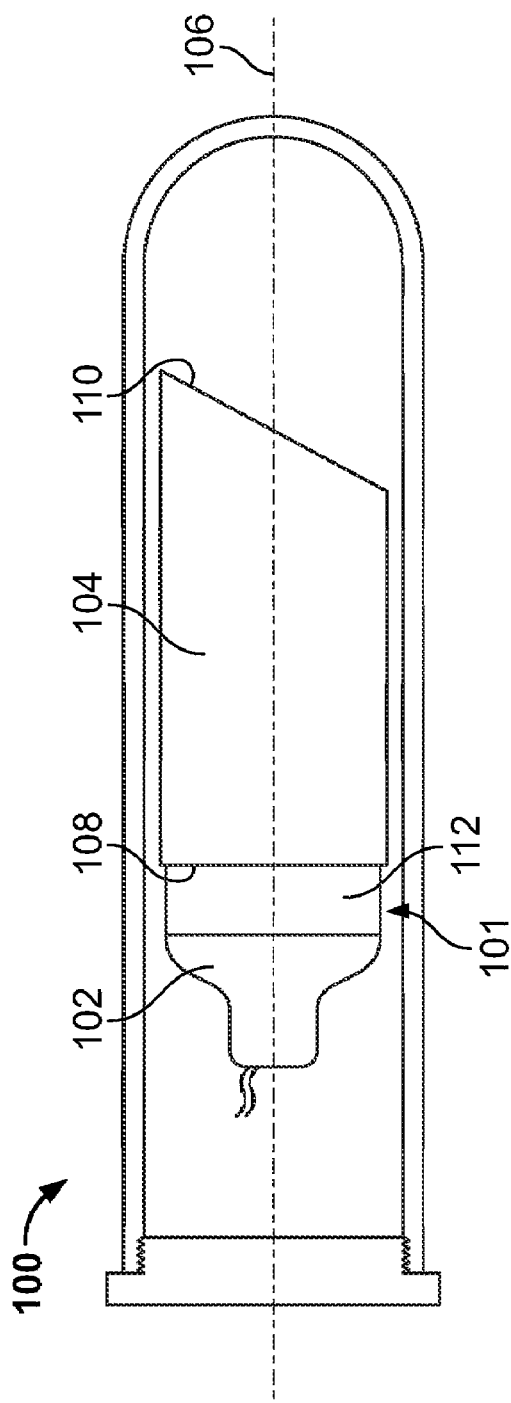
FIG. 1 is a cutaway side view of an exemplary borehole logging tool including a radiation detector in accordance with an embodiment of the present invention.

FIG. 1 is a cutaway side view of an exemplary borehole logging tool 100 including a radiation detector 101 in accordance with an embodiment of the present invention. In the exemplary embodiment, borehole logging tool 100 is used for geophysical logging and oil and gas production. Because the boreholes generally are circular in cross-section, the tools used to log these boreholes are substantially cylindrical to accommodate the dimensions of the borehole. Tools used in the borehole such as for radiation surveying of the borehole, experience elevated pressures and temperatures with respect to surface ambient conditions. Due to the pressures experienced when the borehole is filled with fluid, a substantial cross-section of the tool is used to resist this pressure, leaving a relatively small amount of space available for instrumentation. In the exemplary embodiment, radiation detector 101 includes a photo-detector 102, for example, but not limited to a photomultiplier tube or photodiode and a scintillator 104 that is optically coupled to photo-detector 102.

As used herein, a scintillator is a crystal which is transparent in the scintillation wavelength range which responds to incident radiation by emitting a light pulse. When the scintillator is coupled to a light detection means, the light emitted by the crystal produces an electrical signal proportional to the number of light pulses received and to their intensity. Solid state scintillator crystals are used as components of radiation detectors in X-ray detection apparatus used in the field of oil well logging. Known scintillator crystals include thallium-doped sodium iodide, barium fluoride, bismuth germinate (BGO), cerium-activated gadolinium orthosilicate (GSO), cerium-activated lutetium oxyorthosilicate (LSO), and cadmium zinc telluride (CZT). Other scintillator crystal materials shaped as described herein are also contemplated for use in scintillator 104. In the exemplary embodiment, scintillator 104 is formed of a cylindrical segment shape. A cylindrical segment, sometimes also called a truncated cylinder, is a solid cut from a circular cylinder by one or more planes. In the exemplary embodiment, scintillator 104 is formed in a cylindrical wedge shape wherein two cutting planes define the end shape of scintillator 104, a first plane perpendicular to a longitudinal axis 106 of scintillator 104 and a second plane tilted with respect to longitudinal axis 106. Scintillator 104 includes circularly shaped end 108 and an elliptically shaped end 110 respectively.

In various other embodiments, scintillator 104 is coupled to a single photo-detector 102 directly or using a lightpipe 112, such as a lightpipe having a circular cross-section or an aspheric lightpipe. Scintillator 104 may also include a half-cylindrical shape and may be coupled to photo-detector 102 using an aspheric lightpipe 112. Scintillator 104 may also include other shapes that are not objects of revolution, for example, but, not limited to a quarter-cylindrical shape, an off-axis cylindrical section, a section comprising a concave surface, a section comprising a convex surface, or a combination of sections.

In another alternative embodiment, scintillator 104 is a rectangular slab shape. Scintillator 104 may include a plurality of rectangular slab scintillators spaced about an interior of logging tool 100. Each of the plurality of scintillators may be coupled to a respective photo-detector using an associated lightpipe. In an alternative embodiment, each of the plurality of scintillators may be coupled to any number of photo-detectors using a lightpipe configured to transmit the light signal from scintillator 104 to the associated photo-detectors 102. A longitudinal axis of at least some of the scintillators 104 is parallel to longitudinal axis 106.

Figures 2, 3:
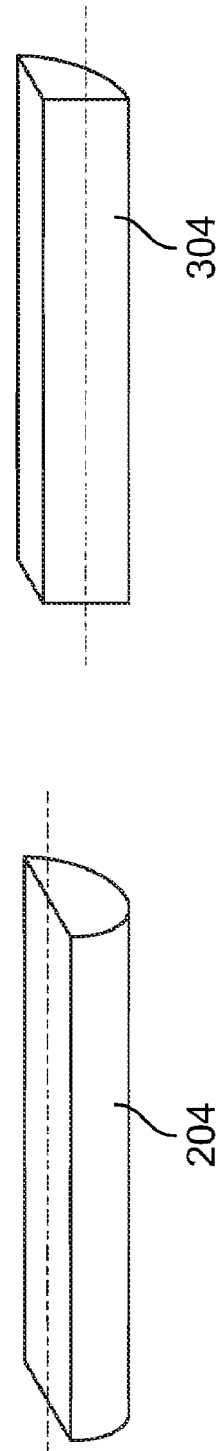
FIG. 2 is a perspective view of an exemplary embodiment of a scintillator that may be used with the borehole logging tool shown in FIG. 1.
FIG. 3 is a perspective view of another exemplary embodiment of a scintillator that may be used with the borehole logging tool shown in FIG. 1.

FIG. 2 is a perspective view of a scintillator 204 that may be used with the borehole logging tool 100 (shown in FIG. 1). In the exemplary embodiment, scintillator 204 includes a half cylindrical cross-section.

FIG. 3 is a perspective view of a scintillator 304 that may be used with the borehole logging tool 100 (shown in FIG. 1). In the exemplary embodiment, scintillator 304 includes a quarter cylindrical cross-section.

Figure 4:
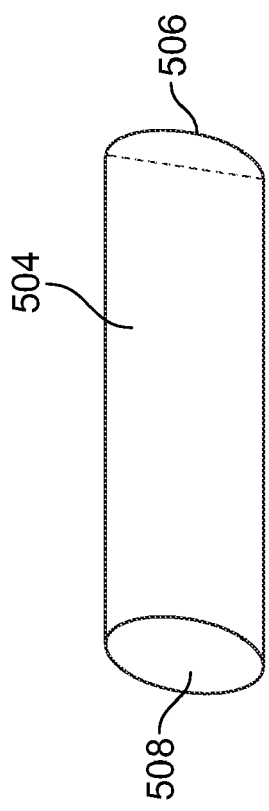
FIG. 4 is a perspective view of yet another exemplary embodiment of a scintillator that may be used with the borehole logging tool shown in FIG. 1.

FIG. 4 is a perspective view of a scintillator 404 that may be used with the borehole logging tool 100 (shown in FIG. 1). In the exemplary embodiment, scintillator 404 includes a truncated cylindrical shape wherein the tilted cutting plane does not extend across the complete diameter 406 of the cylinder. A portion 408 of an end 410 is substantially perpendicular to a longitudinal axis 412 of scintillator 404 and a portion 414 of end 410 is angled obliquely with respect to axis 412.

Figure 5:
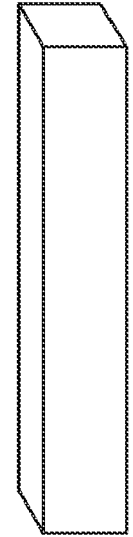
FIG. 5 is a perspective view of still yet another exemplary embodiment of a scintillator that may be used with the borehole logging tool shown in FIG. 1.

FIG. 5 is a perspective view of a scintillator 504 that may be used with the borehole logging tool 100 (shown in FIG. 1). In the exemplary embodiment, scintillator 504 includes a convex end 506 and a concave end 508. In an alternative embodiment, both ends may be either concave or convex.

Figure 6:
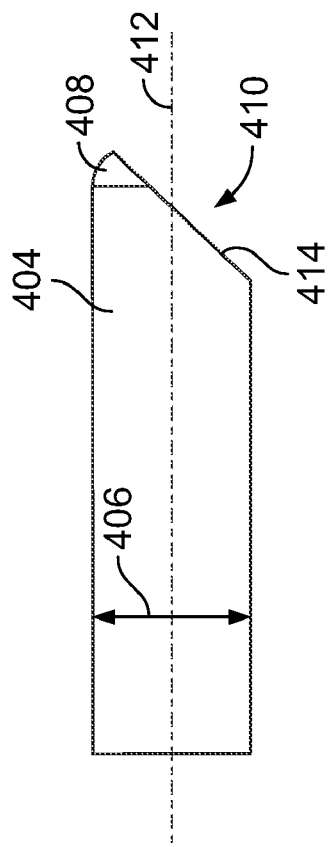
FIG. 6 is a perspective view of another exemplary embodiment of a scintillator that may be used with the borehole logging tool shown in FIG. 1.

FIG. 6 is a perspective view of a scintillator 604 that may be used with the borehole logging tool 100 (shown in FIG. 1). In the exemplary embodiment, scintillator 604 is a cylindrical segment positioned in logging tool (not shown in FIG. 6) offset from a longitudinal axis 606 of the logging tool.

Figure 7:
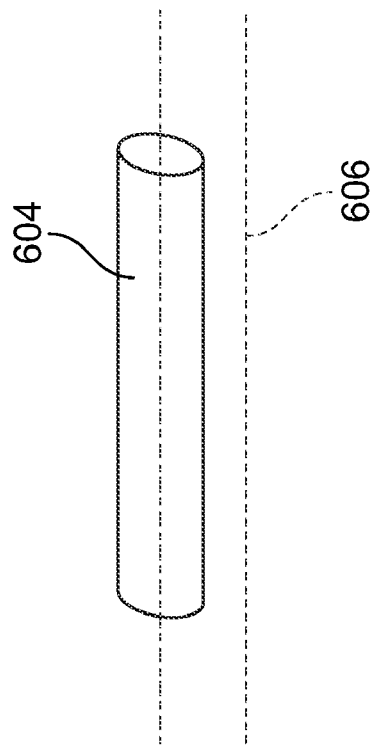
FIG. 7 is a perspective view of yet still another exemplary embodiment of a scintillator that may be used with the borehole logging tool shown in FIG. 1.

FIG. 7 is a perspective view of a scintillator 704 that may be used with the borehole logging tool 100 (shown in FIG. 1). In the exemplary embodiment, scintillator 704 comprises a rectangular slab shape.

Although the scintillator described with respect to a borehole logging tool, other radiation detector applications are able to benefit from the embodiments described herein as for example, a radiation detector, for medical or security applications. Such scintillators find application in medical imaging devices using digital x-ray detectors and photomultiplier tubes. In the security field such scintillators can be used in personnel, equipment and cargo scanners to detect radiation from for example, dirty bomb materials.

The above-described scintillator for a radiation detector is cost-effective and highly reliable. The scintillator assembly is formed by taking one or more sections along the longitudinal direction of a cylindrical scintillator. The cylindrical sectioned scintillator is then coupled to a single photomultiplier directly or using an aspheric lightpipe. The scintillator permits other shaped embodiments to couple to a single photo-detector or to a plurality of detectors.

While the invention has been described in terms of various specific embodiments, those skilled in the art will recognize that the invention can be practiced with modification within the spirit and scope of the claims.

What is claimed is:

1. A radiation detector comprising:
a photo-detector; and
a scintillator optically coupled to said photo-detector and having a longitudinal axis extending therethrough, said scintillator formed in at least one of a cylindrical segment shape and a truncated frustocylindrical shape comprising an end face that extends obliquely from a radially inner surface to a radially outer surface of said scintillator with respect to said longitudinal axis.

2. A radiation detector in accordance with claim 1 wherein said scintillator is coupled to a single photo-detector.

3. A radiation detector in accordance with claim 1 wherein said scintillator is coupled to a single photo-detector using a lightpipe.

4. A radiation detector in accordance with claim 1 wherein said scintillator is coupled to a single photo-detector using an aspheric lightpipe.

5. A radiation detector in accordance with claim 1 wherein said scintillator comprises a half-cylindrical scintillator, said scintillator coupled to said photo-detector using an aspheric lightpipe.

6. A radiation detector in accordance with claim 1 wherein said scintillator comprises a quarter-cylindrical scintillator coupled to said photo-detector.

7. A radiation detector in accordance with claim 1 wherein said scintillator comprises at least one of an off-axis cylindrical section, a section comprising a concave surface, and a section comprising a convex surface.

8. A radiation detector comprising:
a photo-detector; and
a scintillator optically coupled to said photo-detector using a lightpipe, said scintillator formed in one of a rectangular slab shape and a quarter-cylindrical shape.

9. A radiation detector in accordance with claim 8 wherein said scintillator comprises a plurality of rectangular slab shape scintillators optically coupled to said photo-detector, a longitudinal axis of each of said plurality of rectangular slab shape scintillators is substantially parallel to a longitudinal axis of said radiation detector.

10. A radiation detector in accordance with claim 8 wherein said scintillator is coupled to a single photo-detector.

11. A radiation detector in accordance with claim 8 wherein said scintillator is coupled to a single photo-detector using an aspheric lightpipe.

12. A borehole logging tool comprising:
a housing configured to substantially seal a downhole logging environment from an interior of the housing; and
a survey instrument enclosed within the housing, said survey instrument comprising:
a photo-detector; and
a scintillator optically coupled to said photo-detector, said scintillator formed in a non-right circular cylindrical shape.

13. A borehole logging tool in accordance with claim 12 wherein said scintillator is at least one of a frustocylindrical and a truncated frustocylindrical shape.

14. A borehole logging tool in accordance with claim 12 wherein said scintillator is coupled to a single photo-detector.

15. A borehole logging tool in accordance with claim 12 wherein said scintillator is coupled to a single photo-detector using a lightpipe.

16. A borehole logging tool in accordance with claim 12 wherein said scintillator is coupled to a single photo-detector using an aspheric lightpipe.

17. A borehole logging tool in accordance with claim 12 wherein said scintillator comprises a half-cylindrical scintillator, said scintillator coupled to said photo-detector using an aspheric lightpipe.

18. A borehole logging tool in accordance with claim 12 wherein said scintillator comprises a quarter-cylindrical scintillator coupled to said photo-detector.

19. A borehole logging tool in accordance with claim 12 wherein said scintillator comprises at least one of an off-axis cylindrical section, a section comprising a concave surface, and a section comprising a convex surface.

* * * * *